Figure 1:
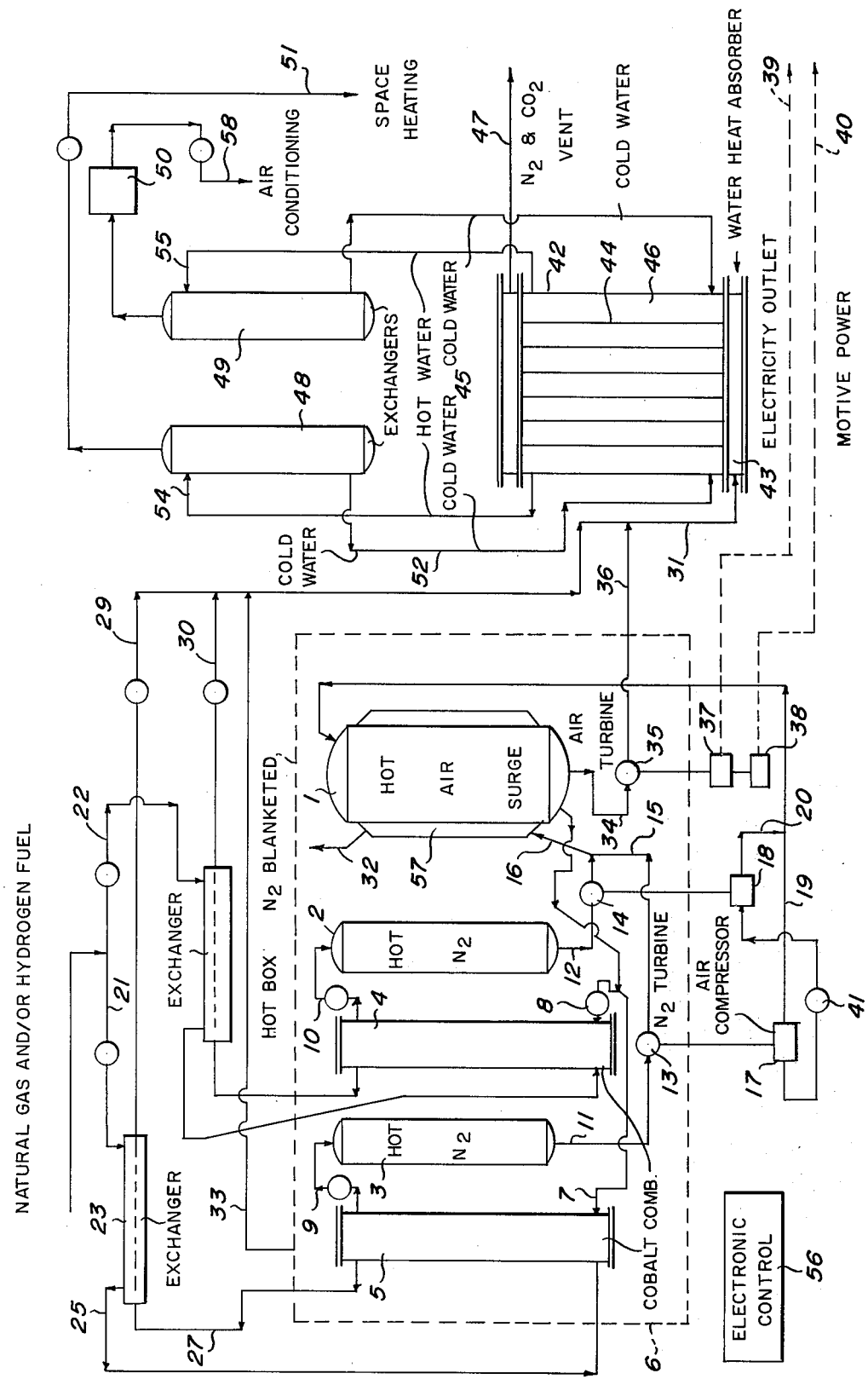

United States Patent [19]  
Leas

[11] 4,091,614  
[45] May 30, 1978

[54] PROCESS FOR MAXIMIZING COMBUSTION OF FUELS

[76] Inventor: Arnold Marcel Leas, 309 E. Van Buren, Columbia City, Ind. 46725

[21] Appl. No.: 721,730

[22] Filed: Sept. 9, 1976

[51] Int. Cl.$^2$ .............................................. F02C 3/20
[52] U.S. Cl. .................................. 60/39.02; 60/39.12; 60/39.46 R; 431/4
[58] Field of Search ................. 60/39.02, 39.03, 39.04, 60/39.12, 39.18 C, 39.18 B, 39.46 G, 39.46 R; 431/4

[56] References Cited

U.S. PATENT DOCUMENTS

| | | |
|---|---|---|
| 3,324,654 | 6/1967 | Squires .................................. 60/39.02 |
| 3,866,411 | 2/1975 | Manion et al. ........................ 60/39.02 |
| 3,903,010 | 9/1975 | Massey et al. ........................ 60/39.02 |
| 3,990,229 | 11/1976 | Staege ................................... 60/39.02 |

Primary Examiner—Carlton R. Croyle  
Assistant Examiner—L. J. Casaregola  
Attorney, Agent, or Firm—Edward E. Dyson; John J. Byrne

[57] ABSTRACT

A process for maximizing combustion of fuels and maximizing thermal efficiency by cooling between or after combustors with heat recovery exchanges as steam generators or superheaters. Excess combustion air requirements are minimized by the utilization of metal oxides to provide oxygen by reaction with steam and producer gas.

8 Claims, 4 Drawing Figures

PROCESS FOR MAXIMIZING COMBUSTION OF FUELS

This invention relates to energy generation. More particularly, this invention relates to an improved process for maximizing combustion of fuels.

In view of the rapidly dwindling supply of fossil fuel resources throughout the world, it is necessary to maximize thermal efficiency, not only from an energy conservation standpoint but also from an environmental standpoint.

The recognized prior art processes and apparatus for burning fuels are generally quite inefficient and serve to exhaust pollutants to the environment. Additionally, inefficient use of the existing supplies of fuel hampers the progress of industrial communities.

In prior art processes, single stage combustion requires quite excessive amounts of air to temperature-protect gas turbine blades, with the excess air compression representing a very substantial negative horsepower requirement and producing an overall low efficiency of from about 15 to 30 percent for gas turbines.

In the prior art excessive combustion temperatures, on the order of from about 2500° to about 4000° F, in the presence of air produces excessive amounts of polluting nitrogen oxides to the atmosphere. Additionally, in the prior art, particularly in miniature total power converters, considerable amounts of power are wasted when diverting from the generation of electricity to space heating or air conditioning or visa-versa. In larger power converters in the prior art such as gas turbines the optimum efficiency is only realized at the very limited design rate.

It is an object of the present invention to obviate the serious deficiencies of the prior art as hereinbefore described.

It is a particular object of the present invention to facilitate substantially complete combustion of fuels during starting, stopping, accelerating and/or deceleration of power demand loads.

It is yet a further object of the present invention to virtually eliminate emission pollution.

It is an object of the present invention to maximize thermal efficiencies even in total power plants where instant and frequent energy changes occur between electrical, space heating or air conditioning or motive power.

It is still another object of the present invention to elongate fuel combustion permitting the extraction of useful energy in-between and after multiple combustion stages to control combustion temperatures and to minimize or eliminate the emission of nitrogen oxides.

These and other objects are realized in accordance with the description of the invention which follows.

In accordance with the present invention, maximum thermal efficiency in fuel combustion is provided by extracting energy prior to and following multiple combustion stages by cooling between or after combustors with heat recovery exchangers as steam generators or superheaters; cooling by chemical or thermal means between, during or following combustors by heat transfer to incoming fuel gas and air; minimizing excess combustion air requirements to from about zero to 5 percent by the utilization of metal oxides to provide oxygen by reaction of said metal oxides with steam and producer gas, and minimizing combustion temperatures to from about 1500° to about 2500° F.

In a preferred embodiment of the present invention, particularly applicable to larger systems such as medium-sized total power plants, small industries and the like, a cobalt hydrogen generator is added to convert a portion of the bleed stream from the gas turbine to hydrogen, which, admixed with the producer gas, serves to enhance combustion.

FIGS. 1 – 4 serve to illustrate the present invention.

FIG. 1 is a diagrammatic representation of the present invention as applicable to miniature total power units employed in residences using natural gas or hydrogen. The miniature, home, total-power unit with relatively low-pressure, gas fuel supplies energy in the form of electricity, space heating or air conditioning, and/or motive power via chemical combustors and batteries; namely, storage of a solid source of oxygen, hot compressed nitrogen and air, hot water with an automatic electronic controller to direct the output of each type of energy on demand.

Referring to FIG. 1, a hot box 6 encases all of the hot containers, i.e., nitrogen, air and oxygen source within a nitrogen-blanketed well-insulated reservoir. The particular type of insulation and reservoir is not germane to the present invention, the requirements for each being simple optimum heat retention. The warm exchanger 42 contains the hot water reservoir. Within the hot box 6, as stated, is situated a hot air surge drum 1, hot nitrogen surge drums 2 and 3, oxygen combustors 4 and 5, nitrogen turbines 13 and 14, air turbine 35 and portions of connecting lines, with the inter-relationship as depicted in FIG. 1. The turbines may be located outside hot box if preferred.

The oxygen source utilized is solid cobalt oxide. Iron oxide could be used also but with less efficiency. Environmentally, combustors containing cobalt oxide as the source of oxygen are superior to conventional air-fuel gas burners in that (a) the excess stored oxygen in the hot cobalt oxide insures complete burning of the fuel gas, (b) the maximum combustion temperature in the fixed beds is controlled below about 2000° F to virtually eliminate the production of nitrogen oxides and (c) the single hot box which encases all the heat generators and heat storage containers virtually eliminates heat losses.

In operation, the high pressure air in surge drum 1 is pressured cyclically through lines 7 and 8 to the cobalt combustors 4 and 5 wherein the oxygen is stored as cobalt oxides, the nitrogen flowing on through lines 9 and 10 to nitrogen surge drums 2 and 3. Effluent nitrogen flows through lines 11 and 12 to drive turbines 13 and 14, exhausting through lines 15 and 16 to heater jacket 57 and venting out nozzle means 32 into hot box 6.

The hot nitrogen then vents out of the hot box via line 33 to a manifold line 31 to a hot water recovery exchanger 42 where most of the residual heat is recovered and transferred to the water.

The nitrogen turbines 13 and 14 serve to drive air compressors 17 and 18 when taking suction through ducts 41 and discharging through lines 19 and 20 to air surge drum 1. It is to be noted that the air compressors 17 and 18, electric generator 37 and power drive 38 are located outside the hot box 6 via the connecting drive shafts and housing packing glands. Such special arrangement is particularly advantageous in that the maintenance of the moving parts of the apparatus is facilitated.

The generated electricity 39 is distributed by suitable means to the use points, not shown. Automatic control of the total power plant is effected by the use of a suitable electronic control station, generally shown at 56.

Fuel, e.g., hydrogen or natural gas, is pressured in through lines 21 and 22 automatically as required to maintain the cobalt beds reduced on a cyclic basis one at a time.

Generally, in the practice of the present invention, it is sufficient to utilize fuel pressured at from about 2 psig to about 4 psig to the cobalt combustors. Generally, the feed of fuel to the cobalt combustors is maintained at from about 0.025 to about 0.25 per pound of cobalt oxides. Cleaner producer fuel gas burning is obtained by utilizing a steam bleed from a steam turbine, shown at to in-process hydrogen generation in the cobalt beds, cyclically used, at temperatures on the order of from about 1200° to about 1800° F. Additionally, a portion of steam may be diverted from between the steam and gas turbines to the cobalt beds to convert some of the carbon monoxide to a cleaner hydrogen fuel source and to reduce heat loss from the barometric condenser depicted at the end of the steam turbine train.

In the cobalt bed reduction cycle the low pressure fuel gas reacts with cobalt oxides:

$$Co_3O_4 + 4H_2 \rightarrow 3Co + 4H_2O + \text{heat}$$

In the alternate oxidation cycle, the reduced cobalt reacts with compressed air:

$$3Co + 2O_2 \rightarrow Co_3O_4 + \text{heat}$$

The net effect upon the use of the oxidation-reduction on the system is to produce heat or superheated steam, nitrogen, and/or carbon-dioxide.

The fuel gas is preheated, generally to a temperature on the order of from about 200° to about 800° F by exchangers 23 and 24, from which the hot gas is discharged via lines 25 and 26 to cobalt beds 4 and 5 and from where the effluent stream is discharged via lines 27 and 28 to the tube side of exchangers 23 and 24, subsequently discharging through lines 29 and 30 to manifold 31 and then to the exchanger 42. The hot nitrogen and/or carbon dioxide, steam and hot air from manifold 31 flow into feeder channel 43 through an exchanger tube 44, an effluent channel 45, with ultimate discharge via vent duct 47 as cold nitrogen, carbon dioxide and condensed water.

The cold recycle water from hot water radiators thermocycles by means of differential density between cold and hot water. The hot water flows upward through lines 54 and 55 to exchangers 48 and 49 from where the water, now at a lower temperature, gravitates downward through lines 52 and 53 to the shell side 46 in exchanger 42. A converter 50 utilizes the hot water to drive air conditioning fluid, depicted at 58, and the balance of the hot water is used to provide space heating, depicted at 51.

Figure 2:
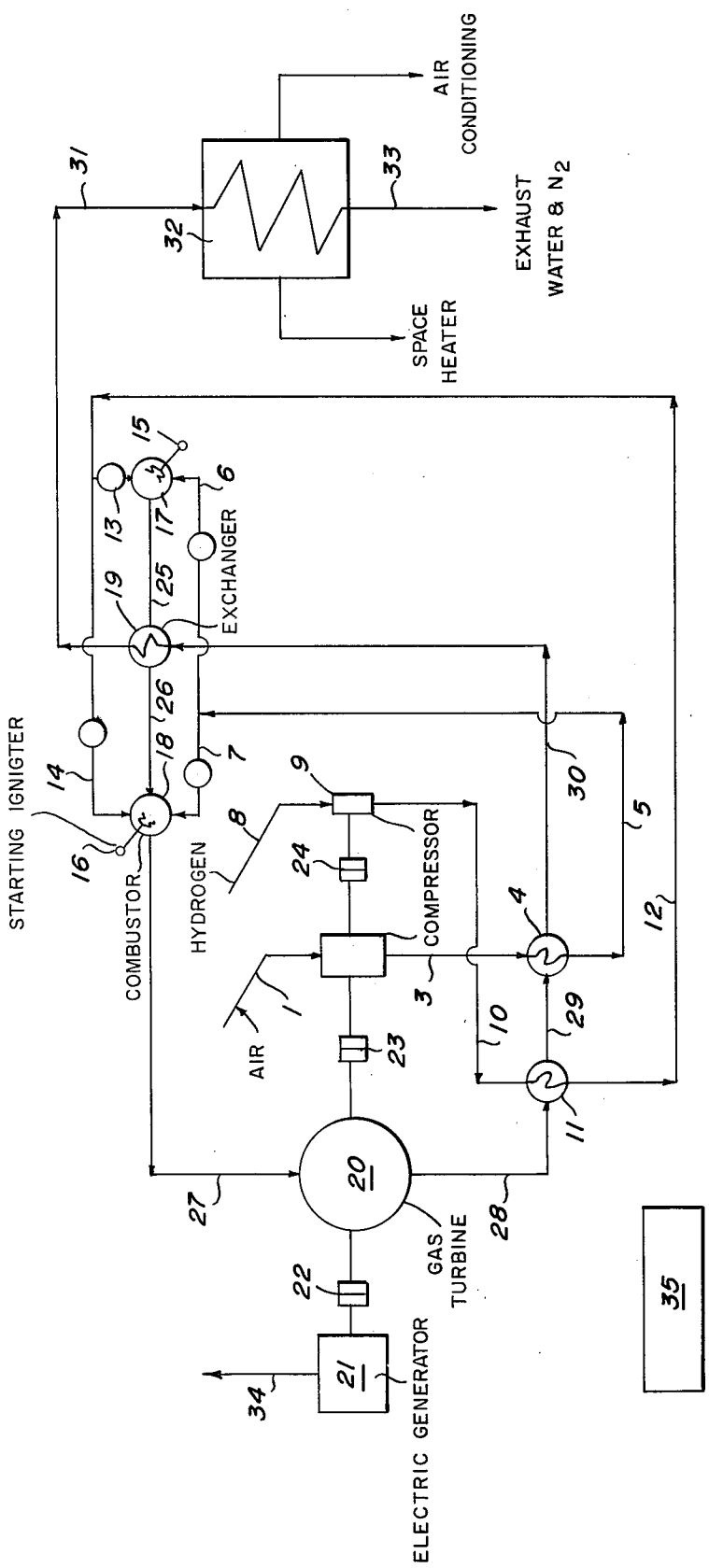

FIG. 2 serves to illustrate the present invention when applied to medium sized total power plants for, e.g., small industries, where the power requirements may exceed those of a home total power plant by a factor of from about 2 to about 20,000.

Air from the atmosphere enters the suction duct 1 to the air compressor 2, is compressed to from atmospheric to about 200 psig, discharges through line 3 to the tube side of the exchanger 4, with hot air at a temperature of from about 200° to about 500° F discharged to and through line 5 to distributor lines 6 and 7 to their respective thermal combustors 17 and 18. A fuel gas, e.g., hydrogen and/or natural gas is supplied to suction line 8 to fuel compressor 9 and discharges via line 10 to the tube side of exchanger 11 to line 12 and distributor lines 13 and 14 to the respective combustors 17 and 18. Startup igniters 15 and 16 may be used as needed to insure fuel combustion. In heat exchanger 19, heat is indirectly absorbed by the exhaust gases in the tube side and heat is liberated on the shell side to cool the partially burned fuel gas. The superheated exhaust gases, at a temperature of from about 400° to about 800° F, from the tube side are pressured at from about 150 to about 200 psig through line 31 to the heating absorbers 32 and then discharge as condensate water and cool nitrogen gas and/or carbon dioxide through vent 33. The shell side of exchanger 19 discharges through line 26 to a secondary combustor 18 at about 1000° F after which the completely burned fuel, as steam, nitrogen, and/or carbon dioxide, is pressured through hot duct 27 to gas turbine 20. The hot exhaust gases discharge through duct 28 to the shell side of exchanger 11, through line 29 to the shell side of exchanger 4, through line 30 to the tube side of exchanger 19, through line 31 to heat absorbers 32 and to the atmosphere, depicted as 33. Suitable variable transmitters 22, 23 and 24 control the loads to drivers 2, 9 and 21. Electrical energy is produced by a suitable electric generator 21 through power discharge 34, with a suitable electronic system 35 controlling the functioning of the overall unit.

Figure 3:
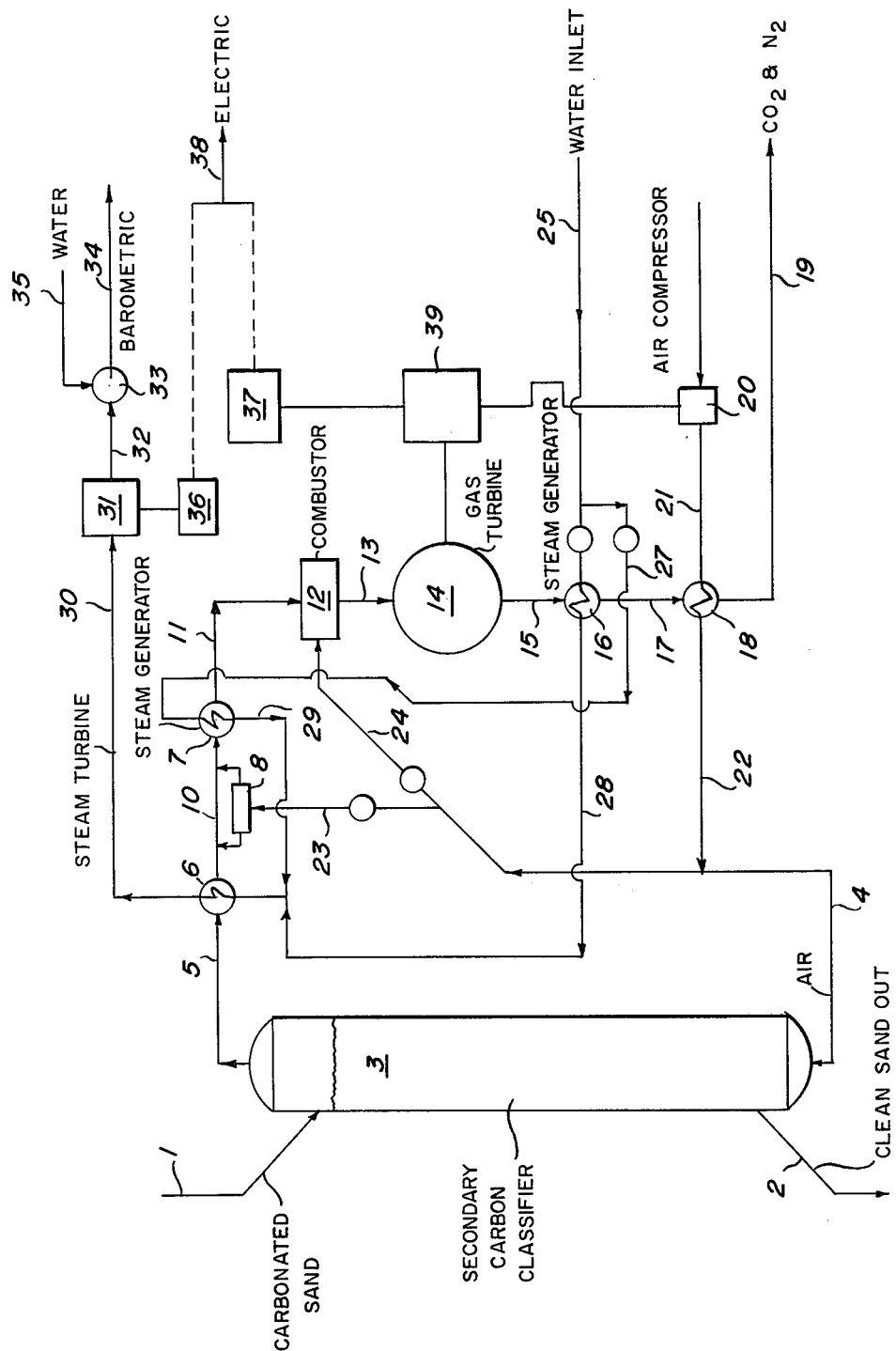

FIG. 3 schematically represents the present invention when applied to large scale powder plants. Hot producer gas 5 is obtained from a suitable source such as from carbon or coal gasification. For the purpose of illustration, the producer gas originates from a secondary carbon gasifier 3 wherein carbonated sand 1 is fed into the top of gasifier 3, is decarbonated at temperatures of about 1000° to about 2000° F with the decarbonated sand 2 discharging through another reactor for recycling. The gasifier air enters through line 4. A portion of the heat energy in the hot producer gas 5 on the order of 1700° ± 400° F. is used in exchanger 6 to superheat steam 30 which serves to drive steam turbine 31 discharging via duct 32 to a barometric condenser 33 and exiting via water duct 34. Cold water 35 enters condenser 33 from pump to condense the exhaust steam. The partially cooled producer gas from exchanger 6 exits line 9 to feed partial combustor 8 wherein appropriate fuel-air ratios are controlled. A portion of the producer gas, on the order of 30 percent is bypassed through orificed line 16 to aid in feeding steam generator 7, and the partially cooled and combusted producer gas is pressured through duct 11 to fuel a final combustor 12. The single air compressor 20 discharges air via line 21 for preheating in exchanger 18, generally to a temperature of from about 250° to about 500° F, then discharges through a manifold 22 to supply gasifier air via line 4, partial combustor 8 via line 23 and final combustor 12 via line 24. The final combustor 12 discharges via duct 13 to a gas turbine 14 which in turn discharges via duct 15, through the shell side of a water exchanger 16, through duct 17, through the shell side of air exchanger 18 with subsequent discharge of cold nitrogen and carbon dioxide via duct 19. Boiler feed water 25 is split fed through line 26 to the tube side of steam generator 16 and through line 27 to steam generator 7. The combined steam from lines 28 and 29 is fed to a steam superheater 6 which discharges through line 30 to steam turbine 31. Electric generators 36 and 37 serve to transmit electricity depicted as 38, to the use points. Gas turbine driver 39 drives both air compressor 20 and electric generator 37.

Figure 4:
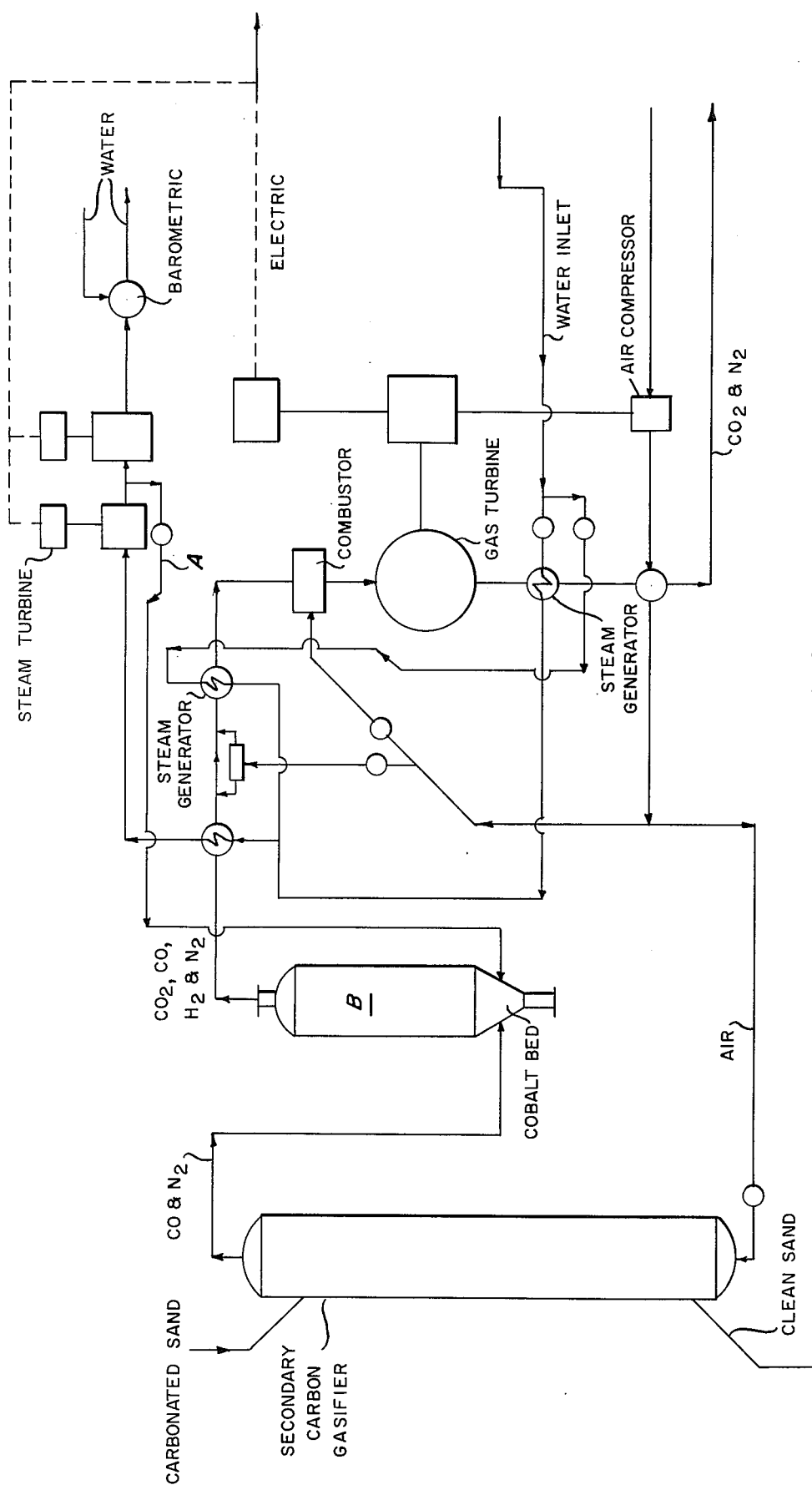

FIG. 4 is applicable to larger size power plants also and is identical to FIG. 3 with the exception of the addition of a cobalt hydrogen generator B, which addition serves to improve combustion, distribute heat, liberation, etc. The hydrogen gas serves to improve the total fuel combustion by minimizing or eliminating carbon deposition in heat exchangers and the combustion train. Also, the produced carbon dioxide serves to gasify any free deposition of carbonaceous material within the combustor train.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

I claim:

1. In a process for combustion of a fuel with oxygen employing multiple combustion stages to form a combustion product wherein the heat of combustion is recovered by waste heat steam generation the improvement which comprises:
   (a) heating fuel gas and oxygen prior to combustion of said fuel gas with said oxygen by heat exchange thereof with said combustion product; and,
   (b) effecting combustion of said preheated fuel gas with said preheated oxygen present in an amount of from about the stoichiometric amount required for combustion to about 5% in excess of the stoichiometric amount required for combustion, said combustion being effected at a temperature of from about 1500° F to about 2500° F and in the presence of steam and a metal oxide selected from the group consisting of iron or cobalt oxide, whereby metal oxide is reduced by said fuel to metallic form and,
   (c) regenerating said metallic iron or cobalt to form iron oxide or cobalt oxide.

2. The process as defined by claim 1 wherein said fuel gas is producer gas.

3. The process of claim 1 wherein the process is effected within a single, nitrogen-insulated hot box.

4. The process as defined by claim 1 wherein the combustion temperature is maintained at less than about 2000° F.

5. The process of claim 2 wherein said producer gas is obtained by carbon gasification.

6. The process of claim 5 wherein said carbon gasification is effected in the presence of hot, circulating sand.

7. The process as defined in claim 1 wherein said regeneration is effected utilizing air.

8. The process of claim 1 wherein steam generated by waste heat steam generation is passed into a steam turbine and a portion of steam from said steam turbine is utilized to regenerate said metallic iron or cobalt and to form hydrogen, which hydrogen is admixed with said fuel gas.

* * * * *